United States Patent [19]

Baker et al.

[11] Patent Number: 4,723,641

[45] Date of Patent: Feb. 9, 1988

[54] CONTACT COLLECTOR SHOE ASSEMBLY

[75] Inventors: Nelson E. Baker, Alliance; John Fahnert, Sebring, both of Ohio

[73] Assignee: Morgan Engineering Systems, Inc., Alliance, Ohio

[21] Appl. No.: 835,276

[22] Filed: Mar. 3, 1986

[51] Int. Cl.$^4$ .............................................. B60L 5/36
[52] U.S. Cl. ...................................... 191/49; 191/60
[58] Field of Search ................... 191/48, 49, 59.1, 60, 191/60.2

[56] References Cited

U.S. PATENT DOCUMENTS

| | | | |
|---|---|---|---|
| 2,210,684 | 8/1940 | Morris, Jr. | 191/59.1 |
| 2,354,885 | 8/1944 | Sierk | 191/49 |
| 2,461,696 | 2/1949 | Morningstar | 191/49 |
| 2,892,904 | 6/1959 | Sterk | 191/49 |
| 3,114,441 | 12/1963 | Sprigings | 191/59.1 X |
| 3,124,226 | 3/1964 | Sprigings | 191/59.1 |
| 3,303,294 | 2/1967 | Howell, Jr. | 191/59.1 X |
| 3,397,291 | 8/1968 | Maloney | 191/49 |
| 3,405,240 | 10/1968 | Kilburg | 191/59.1 |
| 3,439,132 | 4/1969 | Weber | 191/59.1 X |
| 3,509,292 | 4/1970 | Dehn | 191/49 |
| 3,740,498 | 6/1973 | Herbert | 191/49 |
| 4,428,466 | 1/1984 | Mayer | 191/59.1 X |
| 4,464,546 | 8/1984 | Culver | 191/49 |

Primary Examiner—Robert B. Reeves
Assistant Examiner—Donald T. Hajec
Attorney, Agent, or Firm—Renner, Otto, Boisselle & Lyon

[57] ABSTRACT

A collector shoe assembly for transmitting current from an electrified rail to a mobile unit such as a trolley, crane, conveyor, or the like. In a preferred embodiment the electrical collector comprises an electrically conductive shoe for slidably engaging an electrified rail, and a bracket assembly to support and guide the shoe along the rail. The bracket assembly comprises a parallel pair of pivotally supported brackets with a transversely extending support and pivot pin extending between the outer ends. Supported on the pin between the brackets is the shoe which includes a U-shape top channel adapted to receive the pin. The pin is loosely captured within the channel by a pair of readily removable bolt and washer assemblies which are threadedly secured into the top of the shoe. Such construction allows the ready replacement of the shoe and also enables the shoe to adjust vertically and pivot both forwardly and rearwardly relative to the bracket assembly, permitting the shoe to adapt to the various contours of the rail and remain in continuous sliding engagement therewith.

18 Claims, 3 Drawing Figures

U.S. Patent
Feb. 9, 1988
4,723,641
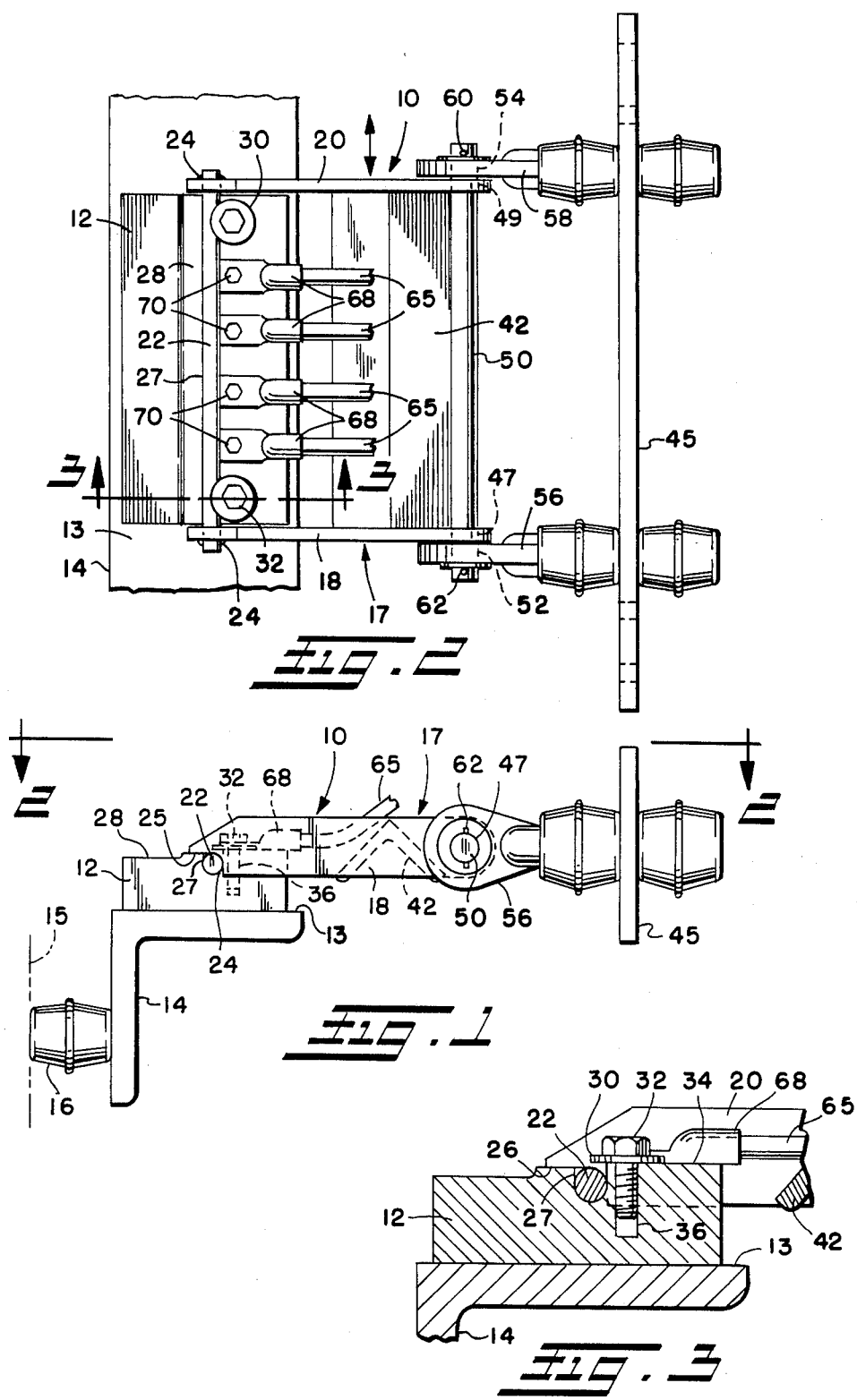

CONTACT COLLECTOR SHOE ASSEMBLY

TECHNICAL DISCLOSURE

The invention relates generally to an electrical contact collector shoe assembly. More specifically the invention relates to a collector shoe assembly for transmitting current from a stationary electrified rail to a mobile unit such as a trolley, crane, conveyor, or the like.

BACKGROUND

Electrically powered mobile units such as cranes, trolleys, conveyors or the like, require considerable amounts of continuous uninterrupted current or power to function properly. Overhead electrical cranes for example, which are utilized extensively in heavy industries such as the basic steel industry, may be required to handle loads in excess of 300 tons. An interruption in the electrical power supply to such a crane while bridging (moving the crane along the runway), trolleying (moving the hoisting mechanism and load along the length of the crane), hoisting (raising the load), or while dynamic braking (motor braking), can result in damage to equipment and pose a threat to human life.

Generally, mobile units such as cranes obtain their power requirements from stationary electrified rails commonly referred to as "third rails". Such rails are usually mounted on the walls, floors, or beams of the structure, which supports the mobile unit, along the path which the mobile unit is intended to travel.

Examples of various means and methods of obtaining power for a mobile unit from an electrified rail or the like are disclosed by the following U.S. patents: Mayer U.S. Pat. No. 4,428,466, Weber U.S. Pat. No. 3,439,132, Kilburg U.S. Pat. No. 3,405,240, Maloney U.S. Pat. No. 3,397,291, Howell U.S. Pat. No. 3,303,294, Springings U.S. Pat. No. 3,124,226, Springings U.S. Pat. No. 3,114,441, Sierk U.S. Pat. No. 2,892,904, and Morris U.S. Pat. No. 2,210,684.

Unfortunately, many of these prior art methods exhibit disadvantages and drawbacks that make their use somewhat less than desirable. For example, some devices provide minimal surface contact between the electrified rail and the collector shoe. In many manufacturing environments wherein the atmosphere is laden with contaminating dirt and oils, such contaminents collect upon the surfaces of the rail contributing to excessive arcing which results in power interruptions and poor shoe life. To avoid the accumulation of contaminents on rails and the resultant effect thereof, a collector device must wipe the surface of the rail. Unfortunately, many prior art devices provide a degree of wiping which is wholly insufficient to keep the rails clean and avoid arcing. Also, many prior art devices create power interruptions because they are unable to adapt to the uneven contours or the misalignment of electrified rails. Furthermore, with many prior art devices in order to service or replace the conductive shoe, the entire collector shoe assembly must be disassembled or removed from the mobile unit resulting in excessive downtime and replacement and maintenance costs.

SUMMARY OF THE INVENTION

The present inventio provides a contact collector shoe assembly for transmitting electrical power from an electrified rail to a mobile unit such as a trolley, crane, conveyor, or the like, which minimizes the possibility of an interruption in the transmission of electrical power to the mobile unit.

In a preferred embodiment of the invention the electrical collector comprises a rectangular-shape electrically conductive shoe for slidably engaging and electrified rail, and a bracket assembly to support and guide the shoe along the rail.

The bracket assembly comprises a pair of pivotally supported brackets having disposed between their distal ends an interconnecting transversely extending support and pivot pin. Supported by the pin between the brackets is the conductive shoe. The conductive shoe includes a U-shape channel or slot extending along its top surface which is adapted to receive the pin. The pin is restricted or captured within the channel with some clearance by a pair of bolt and washer assemblies. The assemblies are threadedly secured into an elevated portion of the top surface of the shoe in the immediate proximity of the pin.

The restriction which the bolt and washer assemblies provide is of a limited nature. Such limited restriction allows the conductive shoe to adjust vertically and pivot both forwardly and rearwardly from a substantially neutral position relative to the bracket assembly. Thus, because the shoe is capable of assuming a multitude of positions it may adapt to the various contours of the electrified rail and remain in continuous sliding engagement therewith minimizing the possibility of a power interruption.

Additionally, because the conductive shoe is in continuous contact with the rail the shoe is able to wipe the rail and prevent the build-up of contaminants thereon, minimizing the possibility of arcing and its resultant power interruptions and poor shoe service life. Furthermore, because the shoe may be quickly and easily removed from the bracket assembly, for such purposes as replacement, simply by removing and reinstalling the bolts.

In addition to the aforementioned, preferably the bracket assembly includes a piece of angle iron transversely extending between the brackets which provides additional structural integrity to the entire collector assembly. Also, at the proximal ends of the brackets wherein they are connected to the mobile unit, which is opposite the distal ends interconnected by the pin, preferably such ends are pivotally connected to the mobile unit generally parallel to the pin so as to permit an additional degree of motion and flexibility to the entire collector assembly.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a side elevational view of the collector shoe assembly in engagement with an electrified rail;

FIG. 2 is a top plan assembly view of the collector assembly of FIG. 1 taken along line 2—2 thereof; and FIG. 3 is a cross-sectional view of the collector assembly of FIG. 2 taken along plane 3—3 thereof.

DETAILED DESCRIPTION OF PREFERRED EMBODIMENT

Referring to the drawing and initially to FIGS. 1 and 2 there is illustrated a collector shoe assembly 10 made in accordance with the present invention which minimizes the possibility of an interruption in the transmission of electrical power. The collector assembly 10 may be used to transmit electrical power from an electrified rail or the like to a mobile unit such as a trolley, crane, conveyor or other like device.

The collector assembly 10 comprises an electrically conductive rectangular-shape shoe 12 for slidably engaging the top surface 13 of a stationary electrified rail 14 mounted to a wall 15 by insulating fastener 16, and a bracket assembly 17 to support and guide the shoe along the rail 14.

The bracket assembly 17 includes a pair of parallel brackets 18 and 20 having disposed between their outer or distal ends an interconnecting transversely extending support and pivot pin 22. Preferably, the pin 22 is secured to the ends of the brackets 18 and 20 by welds designated generally at 24. As illustrated, the distal ends of brackets 18 and 20 include bottom L-shape cut-outs 25 and 26 to receive the pin 22. However, it will be appreciated that the bracket ends may be provided with circular openings through which the pin would be inserted and then secured or welded.

The shoe 12 includes a longitudinally extending central U-shape channel or slot 27 adapted to receive the pin 22 which extends the entire length of the shoe along the top surface 28. The pin 22 is restricted or loosely captured within the channel 27 by a pair of bolt and washer assemblies 30 and 32. The assemblies 30 and 32 are threadedly secured into the somewhat elevated portion 34 of the top surface 28 of the shoe 12, in the immediate proximity of the channel 27, via tapped holesl, one of such holes being indicated at 36. It is noted that the elevated surface, and thus the bottom of the washers, is slightly above the top of the pin when seated in the channel.

The restriction which the bolt and washer assemblies 30 and 32 provide is of a limited nature and may be more appreciated by referring to FIG. 3. This limited restriction allows the shoe 12 to adjust vertically at one or each end and pivot both forwardly or counterclockwise and rearwardly or clockwise from a substantially neutral or horizontal position. With such an extensive degree of motion the shoe 12 is capable of assuming a multitude of positions relative to the bracket assembly 17, thus permitting the shoe 12 to adapt to the various contours of the rail and remain in continuous sliding engagement therewith minimizing the possibility of a power interruption.

In addition to the aforementioned features, the collector assembly 10 also includes a reinforcing angle iron 42 transversely extending between the brackets 18 and 20 which provides additional structural integrity to the entire collector assembly 10. Also, preferably the proximal ends of the brackets 18 and 20 opposite the pin 22 are pivotally connected to the mobile unit 45 to provide additional latitude to the shoe 12. As illustrated, such pivotal interconnection is facilitated by providing the brackets 18 and 20 with aligned proximal openings 47 and 49 through which a rod 50 is inserted. The ends of the rod 50 are in turn inserted through the eyes 52 and 54 of insulating eye bolts 56 and 58 which are connected to a part of mobile unit 45. Rod 50 is secured within the openings by pins 60 and 62.

Electrical power is transmitted from the shoe 12 to the mobile unit 45 via leads 65 which are attached to lugs 68 and in turn threadedly secured to the shoe 12 by lug bolts 70. Although only four connections have been shown, it will be appreciated that the shoe 12 may be provided with any number of connections, and various means of connection may be utilized.

Additionally, although a rectangular-shape shoe 12 has been illustrated, it will be appreciated that shoes having a variety of configurations may be utilized. Also, the pin 22 and the channel or slot 27 may assume any one of a variety of configurations and are in no way limited to the illustrated configurations. The channel 27 and pin 22 may assume a variety of shapes as long as the movement of the shoe is not significantly impaired.

Furthermore, although in this embodiment an L-shape rail 14 has been illustrated, such rail may assume a variety of configurations. Also, such rail, in additio to being mounted to a wall, may also be mounted to other beams, a floor, or any other structural member located along the path which the mobile unit is intended to travel.

Thus, it is clear that the invention provides a contact collector shoe assembly which maximizes the area of contact between the shoe and the rail, results in continual wiping of the rail, minimizes arcing and the detrimental effects associated therewith, and allows for easy service or replacement of the shoe.

Although the invention has been shown and described with respect to a certain preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. An electrical contact collector shoe assembly for transmitting current from an electrified rail to a mobile unit comprising an electrically conductive shoe for slidably engaging and conducting such current from such rail throughout the major length thereof, said shoe having a substantially U-shape channel extending the length of said shoe, bracket assembly means to support and guide said shoe along such rail, a pin which extends along the length of said shoe, and bolt means fixedly secured to said shoe in the proximity of the U-shape channel for confining said pin within said U-shape channel such that said shoe is vertically adjustable relative to said pin and able to pivot both clockwise and counterclockwise about said pin from a substantially neutral horizontal position, thereby permitting said shoe to adapt to various contours of such rail and remain in continuous sliding engagement therewith.

2. An electrical contact collector assembly as set forth in claim 1 wherein said bolt means comprises a bolt and washer assembly threadedly secured to said shoe.

3. An electrical contact collector shoe assembly as set forth in claim 2 wherein said bracket assembly means comprises a pair of brackets transversely disposed to said pin and interconnected at their distal ends by said pin.

4. An electrical contact collector shoe assembly as set forth in claim 3 wherein said brackets are disposed such that said shoe is locted between said brackets, said brackets partially restricting the movement of said shoe relative to said bracket assembly means.

5. An electrical contact collector shoe assembly as set forth in claim 4 wherein said shoe is positioned between the distal ends of said brackets.

6. An electrical contact collector shoe assembly as set forth in claim 5 wherein the proximal ends of said brackets are connected to said mobile unit by a pivotal connection.

7. An electrical contact collector shoe assembly as set forth in claim 6 wherein said pivotal connection includes a pivot parallel to and slightly above said shoe pivot means.

8. An electrical contact collector shoe assembly as set forth in claim 7 wherein said shoe is rectangular-shape having a minor and a major length and said U-shape channel extends parallel to said major length.

9. An electrical contact collector shoe assembly for use in conjunction with a mobile unit comprising an electrically conductive shoe, a pivot pin, said shoe including a channel adapted to receive said pivot pin, bracket assembly means to support said shoe upon such mobile unit, said bracket assembly means comprising a pair of parallel brackets transversely disposed to and interconnected at their distal ends by said pivot pin, said shoe being located between said brackets and further including a bolt and washer assembly threadedly secured thereto in the immediate proximity of said channel and spaced from said pin for confining the pin within said channel such that said shoe can adjust vertically relative to said pivot pin and pivot about said pivot pin both clockwise and counterclockwise from a substantially neutral horizontal position.

10. An electrical contact collector shoe assembly as set forth in claim 9 wherein said pivot pin extends along the length of said sliding shoe.

11. An electrical contact collector shoe assembly as set forth in claim 10 wherein said channel adapted to receive said pivot pin is U-shape.

12. An electrical contact collector shoe assembly as set forth in claim 11 wherein said brackets are interconnected by an strut which provides additional structural integrity to said brackets.

13. An electrical contact collector shoe assembly as set forth in claim 12 wherein the proximal ends of said brackets are pivotally connected to said mobile unit by a pivotal connection.

14. An electrical contact collector shoe assembly as set forth in claim 13 wherein said pivotal connection includes a pivot parallel to and slightly above said pivot pin.

15. An electrical contact collector shoe assembly as set forth in claim 14 wherein said shoe is a rectangular-shape having a minor and a major length and said U-shape channel extends parallel to said major length.

16. An electrical contact collector shoe assembly as set forth in claim 9 wherein the proximal end of said brackets are pivotally connected to said mobile unit by a pivotal connection.

17. An electrical contact collector shoe assembly as set forth in claim 16 wherein said pivotal connection includes a pivot parallel to and slightly above said pivot pin.

18. An electrical contact collector shoe assembly as set forth in claim 17 wherein said shoe is rectangular-shape having a minor and a major length and said channel extends parallel to said major length.

* * * * *